Patented June 7, 1949

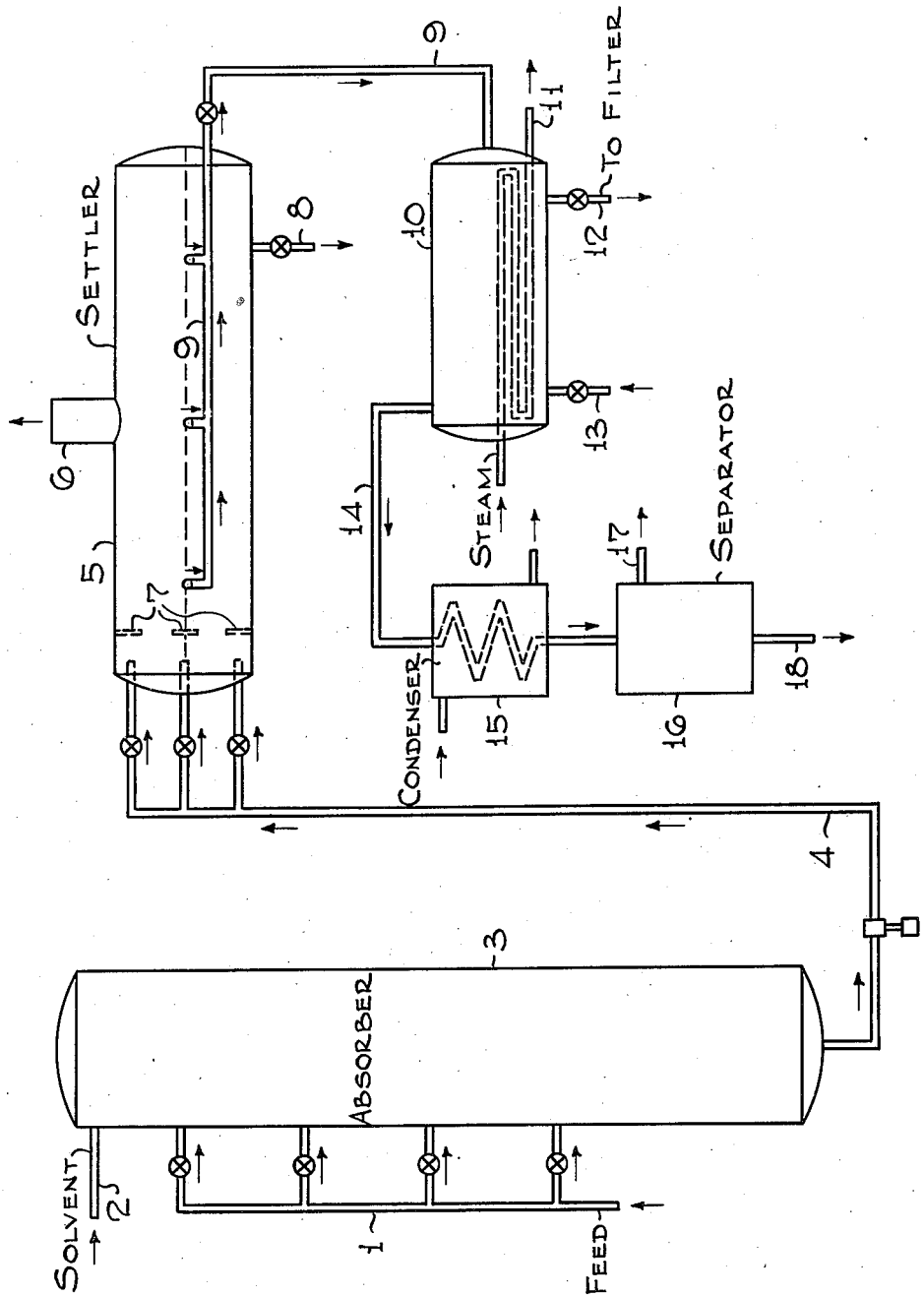

2,472,487

UNITED STATES PATENT OFFICE 2,472,487

BUTADIENE EXTRACTION

John B. Lovell, Baton Rouge, La., assignor to Standard Oil Development Company, a corporation of Delaware Application March 29, 1946, Serial No. 658,208

3 Claims. (Cl. 260—681.5)

This invention relates to improvements in the extraction and concentration of diolefins, and relates particularly to improvements in the extraction and concentration of diolefins where an ammoniacal cuprous acetate solution is used as the extraction agent.

Ammoniacal cuprous salt solutions, such as those of cuprous nitrate, salicylate, cresolate, phenolate, formate, carbonate, acetate, chloride, etc., have been used for the separation of unsaturated hydrocarbons from mixtures of saturated and unsaturated hydrocarbons, such as olefins from paraffins and also for the separation of diolefins from olefins. For example, a solution containing 2 to 5 mols of cuprous copper, 10.5 to 12 mols of ammonia and 4 mols of acetic acid, and having a pH value of 10.5 to 12.5, has been used extensively for concentrating diolefins, for example, butadiene, from mixtures of both saturated and unsaturated hydrocarbons.

The mixture of hydrocarbons obtained by cracking petroleum oils contains together with the olefins, diolefins such as butadiene and also small but varying amounts of acetylenic materials having the following boiling points:

| | °F. |
|---|---|
| Methyl acetylene | —9.8 |
| Butadiene | 24.06 |
| Vinyl acetylene | 41.0 |
| Ethyl acetylene | 47.7 |
| Dimethyl acetylene | 80.4 |

The composition of the mixture of hydrocarbons varies as to the process used and the various feed stocks that are cracked in the preparation of said mixture of hydrocarbons. The acetylene content of a mixture of hydrocarbons obtained by cracking varies from 0.1% by weight to 1.65% by weight of acetylenes in the mixture of hydrocarbons having 4 carbon atoms to the molecule. The steam cracked stocks are generally the lowest, those obtained by catalytic dehydrogenation of butenes are higher, and those obtained by cracking at high temperatures are generally the highest. Where extremely high temperatures, ranging from 1400° to 1800° F., were used in cracking, the acetylenic content increased up to 5% by weight of the mixture of hydrocarbons having the same number of carbon atoms to the molecule.

The lower acetylenic compounds, such as methyl acetylene, can be separated by distillation from the fraction containing four carbon atoms to the molecule. Dimethyl acetylene boiling at a higher temperature can also be separated by distillation. Vinyl acetylene and ethyl acetylene are not readily separated by distillation, but are absorbed by ammoniacal cuprous acetate solution, which, at the same time, absorbs the butadiene. The presence of acetylenic compounds in a butadiene extract is undesirable, and various methods have been devised for the separation of acetylene and butadiene as they are recovered from the ammoniacal cuprous acetate solution. The one method generally used is that of polymerization; that is, by increasing the temperature, the acetylenic compounds tend to polymerize or to undergo other reactions such as copolymerization with the diolefins present, hydration, and/or other reactions which are not clearly identified and hence are classed for convenience as "polymerization" reactions, the products being similarly classed as polymers. One difficulty encountered in using this method of polymerization is that the products vary considerably, i. e., some of the polymers are liquid, some plastic or semi-solid, some are soluble in hydrocarbon solvents and may be readily removed by the use of such solvents; on the other hand, some are insoluble in hydrocarbon solvents and are generally removed by filtration. Some of the polymerized acetylenes are also found to be readily soluble in water and, therefore, as the ammoniacal cuprous acetate solution is an aqueous copper solution, the acetylenic polymers are not readily extracted by the use of these solvents and they are, likewise, not readily removable by ordinary filtration. The exact composition of these acetylenic polymer products that are soluble in water is not known, though they are known to contain oxygen and nitrogen, together with carbon and hydrogen.

Considerable difficulty has been experienced in the operation, especially of a liquid phase butadiene extraction unit, where these acetylenic polymer products are formed, as they are surface-active materials which tend to promote foaming of the solution when contacted with a gas and emulsion formation when the solution is contacted with a liquid hydrocarbon. The main difficulty encountered is severe solution foaming if the concentration of these acetylenic polymer products is allowed to build up in part of the plant. Further, it has been found that foaming conditions are aggravated by the presence of finely divided solid particles which emulsify with the solution to form very stable emulsions, which can be broken most easily by the application of heat. It has been found that these finely divided particles of rust, polymer, or any foreign material that is present, are concentrated by surface tension action at points in the extraction units where there exists a liquid-liquid interface. It is found that, after periods of smooth operation, the concentration of foam and emulsion producing material at the interface is such that any upset in flow tends to dislodge the material, resulting in severe solution foaming and emulsions. This foaming and emulsion reduces the stage efficiency of both the absorption and rejection sections and quite often results in severe solution spilling from the desorber.

According to this invention, the foamants and emulsifiers are prevented from concentrating by withdrawing the material from the liquid-liquid interfaces to a drum equipped with a steam heating coil. In the drum the material is submitted to temperatures high enough to desorb any hydrocarbons and to polymerize any foam producing compounds to higher molecular weight, innocuous polymers. The solution is then circulated through a filter press to remove solids and heavy polymers present and then is returned to the system. Polymer oils are separated by skimming or extraction with light hydrocarbons, such as liquid butene before or after heating. These extracts of polymer oils are suitable for use as drying oils with or without further modification. The molecular weight of the extracted polymer oil may be regulated to give a product of the desired viscosity by regulating the heating time and temperature. They may be further reacted with the diolefins. The advantage of this invention is that the foam-producing polymers are subjected to heat, which further polymerizes them, in a separate system, thus preventing foaming in the stripper and towers.

Another advantage is that the solids are not allowed to concentrate at points in the system, thus reducing the danger of emulsification of the solution if foaming conditions do prevail.

Another advantage is that the solution containing foamants is desorbed in a closed system, eliminating the danger of solution spilling into water scrubbers, distillation equipment, etc., and loss of solution to the sewer.

The concentrations of polymer and solid at a given withdrawal point are as follows:

| Description of Sample | Weight Per Cent Polymer Alcohol Extractable | Per Cent Solids |
| --- | --- | --- |
| Lean Solution from Inventory | 0.04 | <0.01 |
| Absorption Settler Interface | 0.10 | 0.04 |
| Rejection Settler Interface | 0.12 | |
| Absorbtion Settler Bottom | 0.07 | 0.01 |
| Rejection Settler Bottom | 0.08 | 0.03 |
| Absorber Tower Interface | 0.07 | 0.01 |
| Composite of Emulsion Withdrawals | 0.09 | 0.09 |
| Lean Solution from Inventory | 0.04 | <0.03 |
| Absorber Tower Interface | 0.06 | 0.01 |
| Absorption Settler Interface | 0.06 | 0.04 |
| Absorption Settler Bottom | 0.05 | 0.20 |
| Rejection Settler Interface | 0.06 | 0.03 |
| Rejection Settler Bottom | 0.09 | 0.03 |
| Absorber Tower Interface | 0.05 | 0.04 |
| Composite of Emulsion Withdrawal (Before Desorption) | 0.07 | 0.04 |
| Composite of Emulsion Withdrawal (After Desorption) | 0.06 | 0.29 |

The interface concentrations of these materials are greater than those found in the lean solutions.

The operation is illustrated with reference to the accompanying flow diagram, in which a crude liquid mixture of hydrocarbons containing the diolefin to be extracted is represented as being introduced by feed line 1 into the absorber 3 for contact therein with the cuprous salt solution or solvent from line 2. The resulting extraction mixture is pumped from 3 through line 4 into settler 5 provided with baffle means 7 to reduce agitation of the liquids settling into two liquid phases having the liquid-liquid interface while foaming is prevented. The unabsorbed hydrocarbons of the upper liquid layer are withdrawn through line 6. The extract layer is withdrawn by line 8. The foam and emulsion producing material, which concentrates at the interface, is withdrawn therefrom at spaced points through manifold inlets of line 9 to a drum 10 equipped with the steam heating coil 11. The solution in which the foam producing compounds are polymerized is circulated from drum 10 to a filter press (not shown) by line 12, some of the solution requiring such further heat treatment being recycled from the filter press by line 13 to drum 10. Recovery is made of extracted hydrocarbons present in the solution containing the foam producing compound by desorption in drum 10, the desorbed hydrocarbon vapor mixed with some water vapor being passed by line 14 through condenser 15 into separator 16, whence the hydrocarbon material is removed by line 17 and aqueous distillate is removed by line 18. The thus recovered hydrocarbon material and the resulting lean solution after filtration may be returned to the absorber 3.

I claim:

1. In a process for extracting a diolefin from a mixture of hydrocarbons containing a diolefin with a cuprous salt solution, the steps which comprise contacting a liquid mixture of hydrocarbons containing the diolefin with cuprous salt solution, passing the mixture of hydrocarbons and cuprous salt solution to a settler where separate layers of the mixture of hydrocarbons and the cuprous salt solution are formed and withdrawing from the interface of the mixture of hydrocarbons and the cuprous salt solution a portion of said solution, thereby removing substances having a tendency to promote foaming and emulsification.

2. In a process for separating and concentrating butadiene from a mixture of hydrocarbons containing butadiene, the steps which comprise contacting a mixture of hydrocarbons containing butadiene in the liquid phase with an ammoniacal cuprous acetate solution, passing the mixture of hydrocarbons and cuprous salt solution to a settler where separate layers of the mixture of hydrocarbons and the cuprous salt solution are formed, removing a portion of the mixture of hydrocarbons and the ammoniacal cuprous acetate solution from the liquid-liquid interface, thereby removing substances having a tendency to promote foaming and emulsification, heating said mixture of hydrocarbons and ammoniacal cuprous acetate solution to polymerize any acetylenic compounds that may be present, separating the ammoniacal cuprous acetate solution and filtering to remove further any solids or semi-solids, and returning the purified solution to the ammoniacal cuprous acetate solution contacting the mixture of hydrocarbons.

3. In a process for separating and concentrating butadiene from a mixture of hydrocarbons containing butadiene, the steps which comprise contacting a mixture of hydrocarbons containing butadiene in the liquid phase with an ammoniacal cuprous acetate solution, passing the mixture of hydrocarbons and cuprous salt solution to a settler where separate layers of the mixture of hydrocarbons and the cuprous salt solution are formed, removing a portion of the mixture of hydrocarbons and the ammoniacal cuprous acetate solution from the liquid-liquid interface, thereby removing substances having a tendency to promote foaming and emulsification.

JOHN B. LOVELL.

REFERENCES CITED

The following references are of record in the file of this patent:

UNITED STATES PATENTS

| Number | Name | Date |
|---|---|---|
| 2,370,819 | Staid et al. | Mar. 6, 1945 |
| 2,384,329 | Morrell et al. | Sept. 4, 1945 |
| 2,395,529 | Arnold | Feb. 26, 1946 |
| 2,399,882 | Morrell et al. | May 7, 1946 |